No. 748,754. PATENTED JAN. 5, 1904.
L. KRAUSS.
EVENER FOR REAPERS.
APPLICATION FILED JUNE 29, 1903.
NO MODEL. 2 SHEETS—SHEET 2.
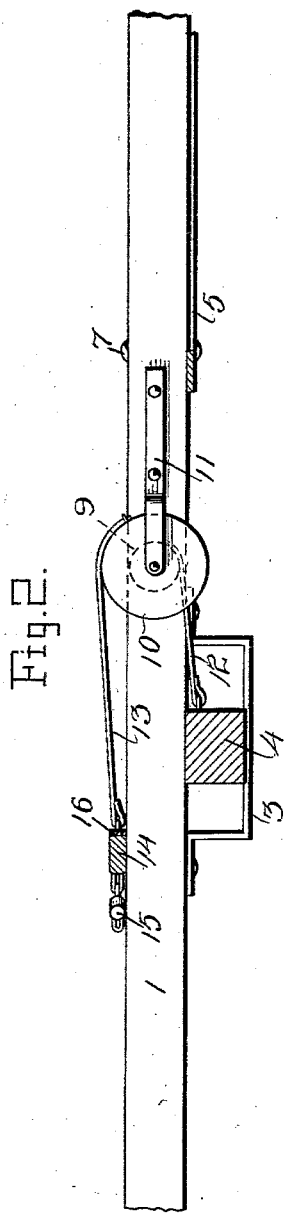
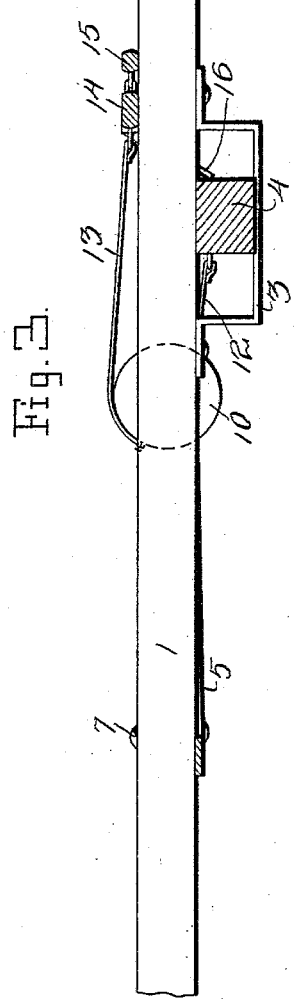
Witnesses
E. K. Reichenbach
O. Richuson
Inventor
Louis Krauss.
By H. B. Wilson,
Attorney No. 748,754. Patented January 5, 1904.

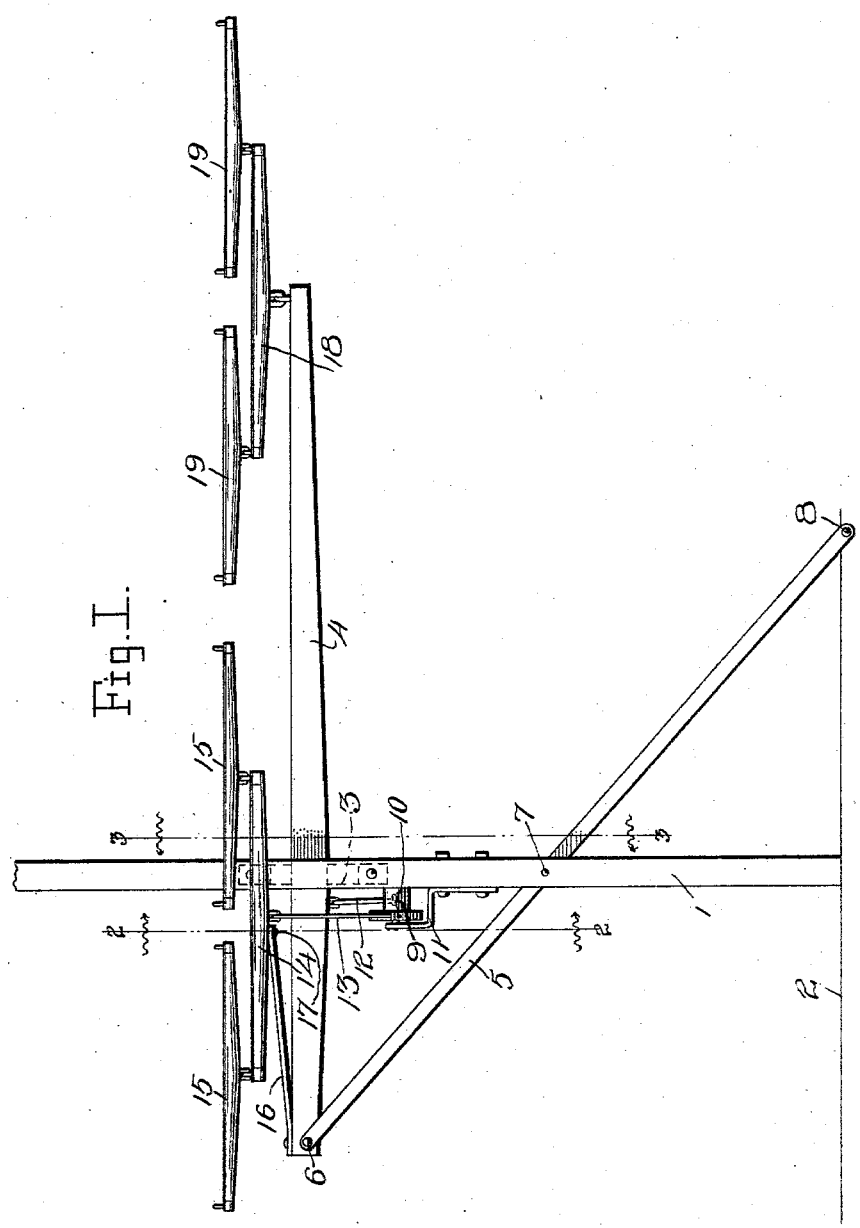

UNITED STATES PATENT OFFICE.

LOUIS KRAUSS, OF NEAR GYPSUM, KANSAS.

EVENER FOR REAPERS.

SPECIFICATION forming part of Letters Patent No. 748,754, dated January 5, 1904.

Application filed June 29, 1903. Serial No. 163,569. (No model.)

*To all whom it may concern:*

Be it known that I, LOUIS KRAUSS, a citizen of the United States, residing near Gypsum, in the county of Saline and State of Kansas, have invented a new and useful Improvement in Eveners for Reapers, of which the following is a specification.

My invention is an improved four-horse evener or draft-equalizer especially adapted for use in connection with reaping-machines and other similar machines; and it consists in the construction, combination, and arrangement of devices hereinafter described and claimed.

One object of my invention is to provide a four-horse evener of the class described which is effective to obviate the side draft of a reaper caused by the sickle-bar or platform thereof.

A further object of my invention is to provide a four-horse evener which is adapted for the attachment of a team outside of the tongue team without causing side draft.

In the accompanying drawings, Figure 1 is a top plan view of a draft equalizer or evener embodying my improvements. Fig. 2 is a sectional view of the same, taken on the plane indicated by the line 2 2 of Fig. 1. Fig. 3 is a similar view taken on the plane indicated by the line 3 3 of Fig. 1.

The tongue 1 projects from the reaper, the front line of which is indicated at 2. On the under side of the tongue at a suitable distance in advance of the reaper is a keeper 3, which extends longitudinally thereof and through which extends an equalizing-bar 4, the shorter end of which projects beyond the inner or grain side of the tongue and the long end of which projects beyond the outer or stubble side of the tongue. The said evener-bar is movable between the keeper and the tongue, and its shorter end is pivotally connected to a diagonally-disposed brace-bar 5, as at 6. The said brace-bar passes under and is attached to the tongue, as at 7, and its rear end is pivotally connected to the reaper, as at 8. The connection 7 allows of some play between the brace-bar and the tongue.

On the inner or grain side of the tongue at a suitable distance in rear of the evener-bar 4 is mounted a pair of rollers or wheels 9 10 of unequal diameter, the bearings for the same being shown at 11 and the said wheels or rollers being fast together to rotate in unison. A chain or cord 12 connects the evener-bar 4 to the smaller wheel or roller 9. A chain or cord 13 is attached to the side of the wheel or roller 9, to which the chain 12 is connected, and to the front end of the said chain or cord 13 is attached a doubletree 14, having swingletrees 15 for the attachment of the tongue team, the said swingletrees being on opposite sides of the tongue. A link 16 is pivotally connected to the shorter end or arm of the evener-bar 4, and the inner end thereof is pivotally connected to the doubletree 14, as at 17. In effect the chains 12 13 constitute a flexible connecting element between the doubletree 14, which is a draft element, and the evener-bar, and the wheel or roller 10 and roller 9, to which the said chains are attached and on which they are reversely wound, constitute a direction element for the connecting element.

It will be understood from the foregoing that when the doubletree 14 is drawn forwardly it tends to uncoil the chain 13 from the wheel or roller 10, and in so doing causes the wheels or rollers to rotate, so that the roller 9 coils the reversely-wound chain or cord 12 thereon, thereby drawing rearwardly on the evener-bar 4. To the outer end of the latter on the stubble side is attached a doubletree 18, which carries swingletrees 19.

It will be understood from the foregoing that the evener-bar and connections hereinbefore described between it and the doubletree 14 serve to evenly distribute the draft between the outside team and the inside or tongue team and that the diagonally-disposed brace-bar 8, which connects the stubble side of the reaper to the inner end of the evener-bar, serves to effectually prevent side draft.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus fully described my invention, what I claim as new, and desire to secure by Letters Patent, is—

1. The combination of an evener-bar, a tree attached to the outer end thereof, a tree disposed near the opposite end thereof and connected thereto, a flexible connecting element, between the last-mentioned tree and the evener-bar, and a direction element for said flexible connecting element in rear of the evener-bar, substantially as described.

2. The combination of a tongue, a brace disposed obliquely with reference thereto, an evener-bar having its shorter end pivotally connected to the said brace, a draft element at the outer longer end of the evener-bar, a draft element near the inner end thereof, a link connecting the last-mentioned draft element to the evener-bar, a flexible element connecting the last-mentioned draft element to the evener-bar, and a direction element in rear of the evener-bar for said flexible connecting element.

3. The combination of a tongue, a brace-bar disposed obliquely with reference thereto and extending beyond the inner side thereof, an evener-bar having its inner end pivotally connected to said brace-bar, revoluble drum elements of unequal diameter, bearings and supports therefor, in rear of the evener-bar, and draft element, a link connecting the latter to the inner end of the evener-bar, and flexible elements connecting the latter and the draft element to the revoluble drum elements and reversely wound on the latter, substantially as described.

In testimony whereof I have signed my name to this specification in presence of two subscribing witnesses.

LOUIS KRAUSS.

Witnesses:
J. F. KRAUSS,
J. SCHMITTER.